(12) United States Patent
Min

(10) Patent No.: US 8,289,868 B2
(45) Date of Patent: Oct. 16, 2012

(54) NETWORK DEVICE AND METHOD OF MEASURING UPSTREAM BANDWIDTH EMPLOYED THEREBY

(75) Inventor: Zhen-Fa Min, Shanghai (CN)

(73) Assignees: Ambit Microsystems (Shanghai) Ltd., Shanghai (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 261 days.

(21) Appl. No.: 12/551,675

(22) Filed: Sep. 1, 2009

(65) Prior Publication Data

US 2010/0246422 A1 Sep. 30, 2010

(30) Foreign Application Priority Data

Mar. 24, 2009 (CN) .......................... 2009 1 0301081

(51) Int. Cl.
*H04L 12/26* (2006.01)
(52) U.S. Cl. ......... 370/252; 370/232; 370/254; 370/389
(58) Field of Classification Search .......... 370/241–242, 370/232, 252, 352, 254, 389, 392; 709/224, 709/238

See application file for complete search history.

(56) References Cited

U.S. PATENT DOCUMENTS

| | | | | |
|---|---|---|---|---|
| 5,708,654 A * | 1/1998 | Arndt et al. | .................... | 370/242 |
| 6,192,404 B1 * | 2/2001 | Hurst et al. | .................... | 709/224 |
| 6,965,573 B1 * | 11/2005 | Mizukoshi | .................... | 370/252 |
| 7,099,283 B2 * | 8/2006 | Matta et al. | .................... | 370/252 |
| 7,385,937 B2 * | 6/2008 | Lebrun et al. | ................. | 370/254 |
| 7,804,777 B2 * | 9/2010 | Krueger | ......................... | 370/232 |
| 7,826,363 B2 * | 11/2010 | Dunlap et al. | ................. | 370/232 |
| 7,852,774 B2 * | 12/2010 | Shen et al. | .................... | 370/241 |
| 7,860,021 B2 * | 12/2010 | Koyama et al. | ............... | 370/252 |
| 7,872,992 B2 * | 1/2011 | Ukita et al. | .................... | 370/256 |
| 2002/0156917 A1* | 10/2002 | Nye | ............................... | 709/238 |
| 2007/0025263 A1* | 2/2007 | Dunlap et al. | ................. | 370/252 |
| 2007/0253445 A1 | 11/2007 | Lee | | |
| 2008/0019367 A1* | 1/2008 | Ito et al. | ........................ | 370/392 |
| 2008/0101378 A1 | 5/2008 | Krueger | | |
| 2008/0107107 A1* | 5/2008 | Shen et al. | .................... | 370/389 |
| 2010/0103822 A1* | 4/2010 | Montwill | ....................... | 370/242 |

FOREIGN PATENT DOCUMENTS

CN 1929442 3/2007
CN 101026509 7/2011

* cited by examiner

*Primary Examiner* — Michael Thier
*Assistant Examiner* — Vincelas Louis
(74) *Attorney, Agent, or Firm* — Altis Law Group, Inc.

(57) ABSTRACT

A network device measures upstream bandwidth of a communication network. The communication network includes a server and a plurality of communication nodes. The network device transmits a sequence of Internet control message protocol (ICMP) request datagrams corresponding to a sequence of time to live (TTL) increased from a first value to a second value to the server via the communication nodes. The network device designates the communication node that transmits an overtime datagram first as the best communication node, transmits a plurality of ICMP detection datagrams to the best communication node, receives response datagrams and records receiving time thereof, and calculates the upstream bandwidth according to size of the plurality of ICMP detection datagrams and the recorded receiving time of the response datagrams.

10 Claims, 2 Drawing Sheets

NETWORK DEVICE AND METHOD OF MEASURING UPSTREAM BANDWIDTH EMPLOYED THEREBY

BACKGROUND

1. Technical Field

Embodiments of the present disclosure relate to network communication, and more particularly to a network device and a method of measuring upstream bandwidth employed thereby.

2. Description of Related Art

Flow control is an important quality of server (QoS) consideration in network communication. Measurement of upstream bandwidth is a widely implemented method for controlling flow of the communication network.

Currently, accurate measurement of the upstream bandwidth of the communication network is accomplished by transmitting a plurality of Internet control message protocol (ICMP) request datagrams to a communication network server in the network and calculating the upstream bandwidth according to the reception time of response datagrams related to the ICMP datagrams. However, most communication network servers do not always respond to the ICMP request datagrams, such that upstream bandwidth may not always be measured. Therefore, there is a requirement for a solution that can overcome the limitations described.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
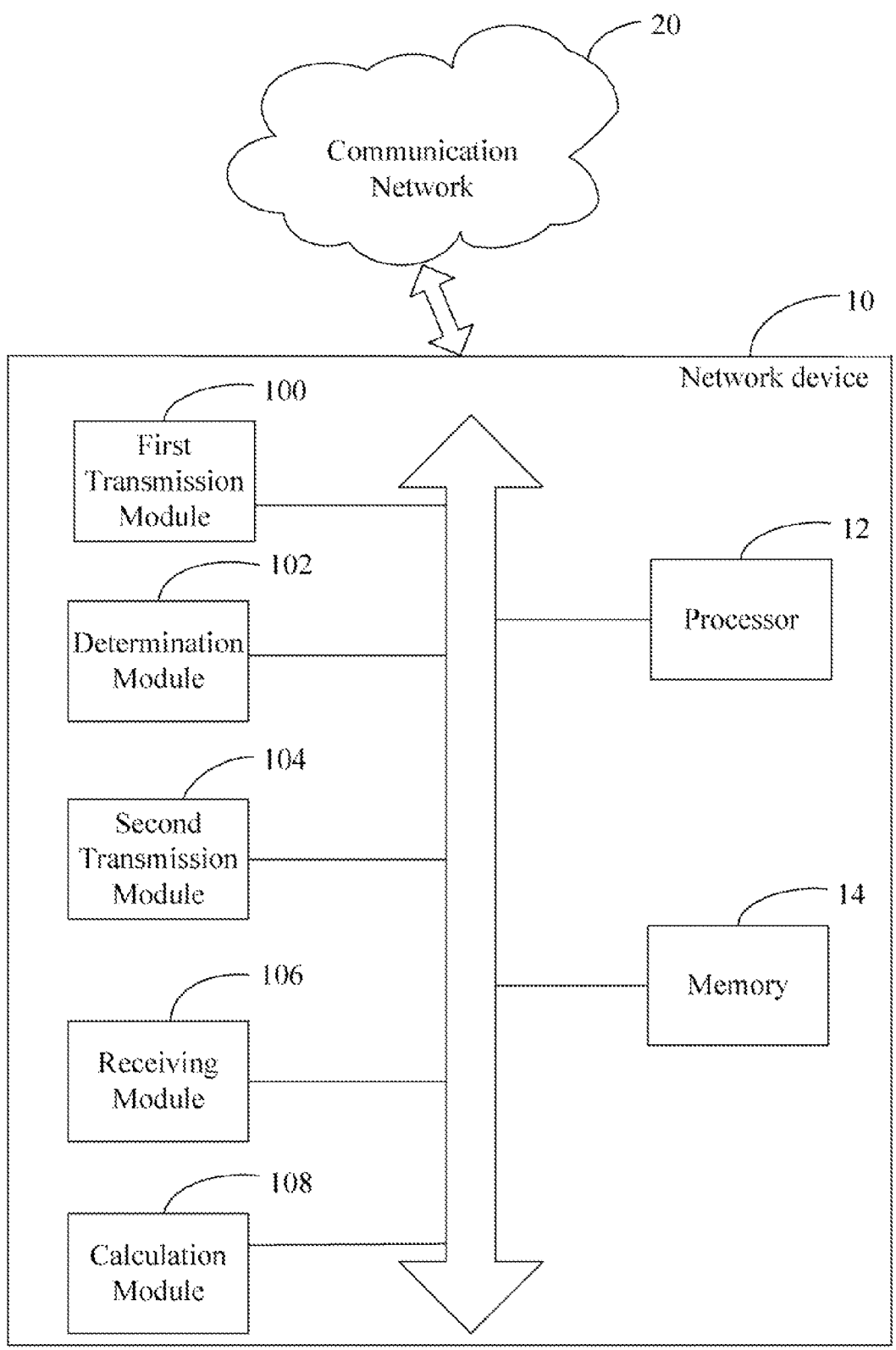
FIG. 1 is a schematic diagram of an application environment and functional modules of a network device of the present disclosure.

FIG. 1 is a schematic diagram of an application environment and functional modules of a network device 10 of the present disclosure. The network device 10 is operable to measure upstream bandwidth of a communication network 20. The communication network 20 comprising a server and a plurality of communication nodes configured between the network device 10 and the server. Each node including a unique network address, being a router, a switch, or a gateway. The communication network 20 may be an asymmetrical digital subscriber loop (ADSL) network, for example. The network device 10 may be a router, a switch, or a gateway, for example.

The network device 10 comprises a first transmission module 100, a determination module 102, a second transmission module 104, a receiving module 106, a calculation module 108, a processor 12, and a memory 14. The modules 100-108 may include one or more programs stored in the memory 14 and are executed by the at least one processor 12.

The first transmission module 100 is operable to transmit a sequence of Internet control message protocol (ICMP) request datagrams corresponding to a sequence of time to live (TTL) to the server via the communication nodes. Here, the sequence of the TTL is increased by degrees from a first value to a second value and when one of the ICMP request datagrams reaches one of the communication nodes, the TTL of the ICMP request datagram is decreased by 1, if one of the communication nodes receives an ICMP request datagram with TTL of 1, the communication node transmits an overtime datagram to the network device 10.

Here, each ICMP request datagram has a TTL field which is operable to measure presence of the ICMP request datagram in the communication network 20, which avoids infinite presence of the datagram in the communication network 20. Here, the sequence of ICMP request datagrams corresponding to a sequence of TTL to the server are transmitted at the same time. The TTL of each ICMP request datagram is reduced by one when the ICMP request datagram passes each of the communication nodes. The communication node transmits the ICMP request datagram to a subsequent communication node when the TTL of each ICMP request datagram exceeds one. Once one communication node of the communication network 20 has received a ICMP request datagram of the TTL equal to one, the communication node discards the ICMP request datagram and transmits an overtime datagram to the network device 10. Here, the first value and the second value are both premeasured as any natural number and a second value exceeding the first.

The determination module 102 is operable to determine whether one of the communication nodes has transmitted the overtime datagram to the network device 10 and designate the communication node that transmits the overtime datagram first as the best communication node. Here, the sequence of ICMP request datagrams corresponding to a sequence of TTL to the server are transmitted at the same time. However, practically, the communication network 20 experiences delays such that the determination module 102 receives the overtime datagrams in sequence. The determination module 102 designates the communication node that transmits the overtime datagram first as the best communication node. Here, if the ICMP request datagrams corresponding to a sequence of TTL to the server are not transmitted at the same time, the determination module 102 designates one communication node as the best communication node, the communication node having the least difference between a receiving time of the overtime datagram and a transmitting time of the corresponding ICMP request datagram.

The first transmission module 100 is further operable to increase the second value and transmit another sequence of ICMP request datagrams with another sequence of TTL from the first value to the increased second value when the network device 10 does not receive the overtime datagram. Here, increases in the second value are not limited. If the network device 10 has not received the overtime datagram, the first transmission module 100 periodically transmits a sequence of ICMP request datagrams corresponding to a sequence of TTL from the first value to the increased second value. As such, the communication node returning the ICMP request datagram first is designated as best by periodically increasing the second value.

The second transmission module 104 is operable to transmit a plurality of ICMP detection datagrams to the best communication node. Here, the plurality of ICMP detection datagrams are transmitted at the same time. Therefore, the best communication node returns each of the ICMP request datagrams transmitted by the second transmission module 104 because the best communication node returns the ICMP request datagram.

The receiving module 106 is operable to receive response datagrams corresponding to the plurality of ICMP detection datagrams from the best communication node and records receiving time thereof. Here, the response datagrams are not received at the same time as the network 20 experiences a delay. Receiving time of the response datagrams corresponding to the plurality of ICMP detection datagrams to the best communication node comprises an earliest receiving time and a latest receiving time, wherein the earliest receiving time indicates the receiving time of the first received response datagram, and the latest receiving time indicates the receiving time of the latest received response datagram.

The calculation module 108 is operable to calculate an upstream bandwidth according to size of the plurality of ICMP detection datagrams and the recorded receiving time of the response datagrams corresponding to the plurality of ICMP detection datagrams. Here, a difference between the latest receiving time and the earliest receiving time can be calculated. The calculation module 108 calculates the upstream bandwidth according to the difference between the latest receiving time and the earliest receiving time and the size of the plurality of ICMP detection datagrams. Here, the upstream bandwidth is equal to a bit number of the plurality of ICMP detection datagrams to the best communication node divided by a difference between the latest receiving time and the earliest receiving time.

Figure 2:
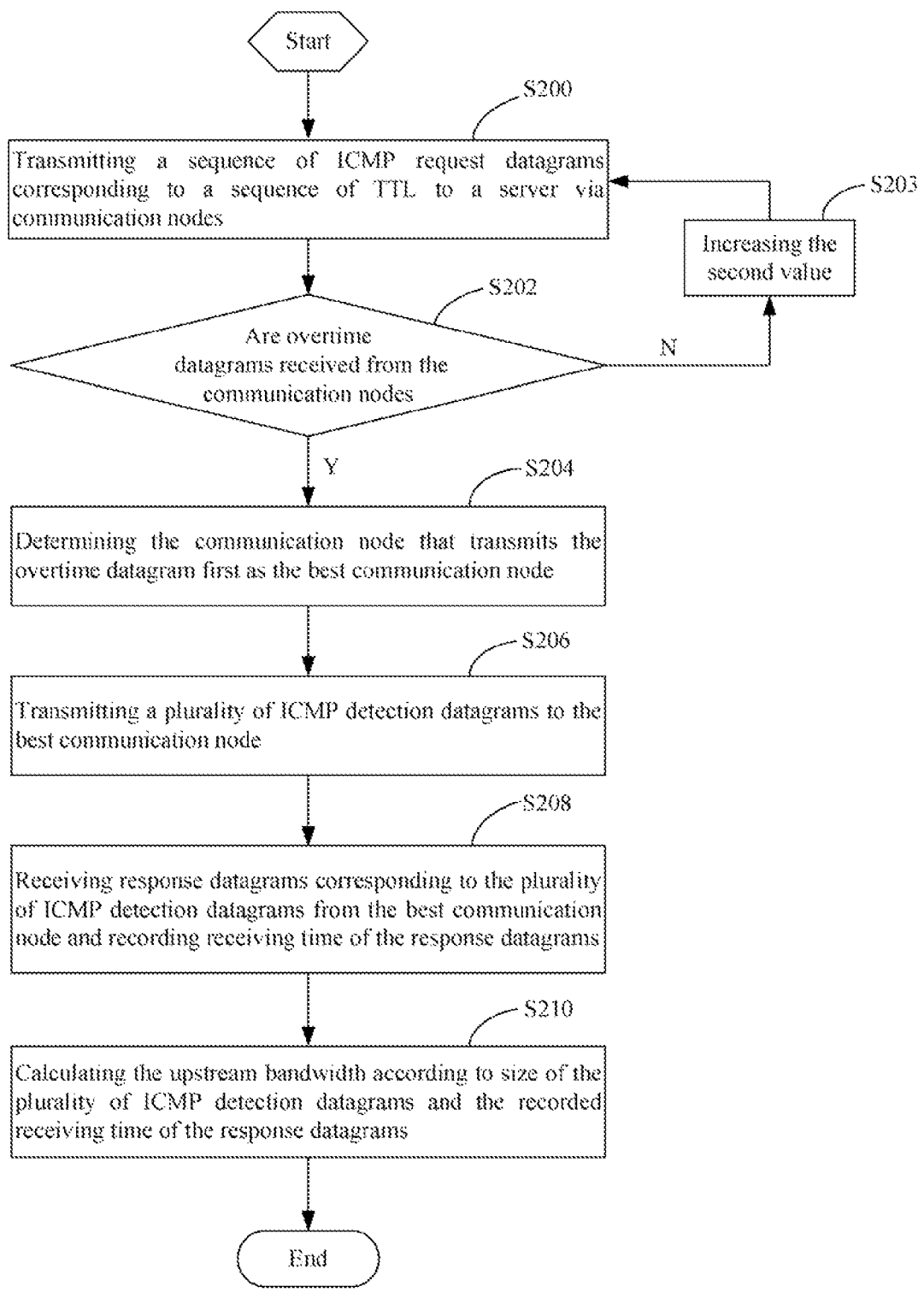
FIG. 2 is a flowchart of a method of measuring upstream bandwidth employed in a network device such as, for example, that of FIG. 1 in accordance with the present disclosure.

FIG. 2 is a flowchart of a method of measuring upstream bandwidth employed in a network device such as, for example, that of FIG. 1, executed by the functional modules thereof. Depending on the embodiment, additional blocks may be added, others deleted, and the ordering of the blocks may be changed while remaining well within the scope of the disclosure.

In block S200, the first transmission module 100 transmits a sequence of Internet control message protocol (ICMP) request datagrams corresponding to a sequence of time to live (TTL) to the server via the communication nodes. Here, the sequence of the TTL is increased by degrees from a first value to a second value and when one of the ICMP request datagrams reaches one of the communication nodes, the TTL of the ICMP request datagram is decreased by 1, if one of the communication nodes receives an ICMP request datagram with TTL of 1, the communication node transmits an overtime datagram to the network device 10. As described, the first value and the second value are both premeasured as any natural number with the second value exceeding the first. For example, if the first value is premeasured as 1, the second value is premeasured as 10, the first transmission module 100 transmits 10 ICMP request datagrams with TTL increased from 1 to 10 to the special node.

Here, the sequence of ICMP request datagrams corresponding to a sequence of TTL to the server is transmitted at the same time. The TTL of each ICMP request datagram is reduced by one when the ICMP request datagram passes each of the communication nodes. The communication node transmits the ICMP request datagram to a subsequent communication node when the TTL of each ICMP request datagram exceeds one. Once one communication node of the communication network 20 has received a ICMP request datagram of the TTL equal to one, the communication node discards the ICMP request datagram and transmits an overtime datagram to the network device 10.

In block S202, the determination module 102 determines whether the overtime datagrams are received from the communication nodes.

If the overtime datagrams are not received from the communication nodes, then in block S203, the first transmission module 100 increases the second value and transmits another sequence of ICMP request datagrams with another sequence of TTL from the first value to the increased second value to the server.

If the overtime datagrams are received from the communication nodes, then in block S204, the determination module 102 designates a communication node that transmits the overtime datagram first as the best communication node according to the received overtime datagrams. Here, the sequence of ICMP request datagrams corresponding to a sequence of TTL to the server is transmitted at the same time. However, practically, the communication network 20 experiences delay, such that determination module 102 receives the overtime datagrams in sequence. The determination module 102 designates the communication node that transmits the overtime datagram first as the best communication node.

In block S206, the second transmission module 104 transmits a plurality of ICMP detection datagrams to the best communication node. Here, the plurality of ICMP detection datagrams to the best communication node are transmitted at the same time. Therefore, the best communication node returns each of the ICMP request datagrams transmitted by the second transmission module 104 because the best communication node returns the ICMP request datagram.

In block S208, the receiving module 106 receives response datagrams corresponding to the plurality of ICMP detection datagrams from the best communication node and recording receiving time of the response datagrams. Here, the response datagrams are not received at a same time as the network 20 experiences delay. As described, receiving time of the response datagrams corresponding to the plurality of ICMP detection datagrams to the best communication node comprises an earliest receiving time and a latest receiving time, wherein the earliest receiving time indicates the receiving time of the first received response datagram, and the latest receiving time indicates the receiving time of the latest received response datagram.

In block S210, the calculation module 108 calculates the upstream bandwidth according to size of the plurality of ICMP detection datagrams and the recorded receiving time of the response datagrams corresponding to the plurality of ICMP detection datagrams. Here, the upstream bandwidth is equal to a bit number of the plurality of ICMP detection datagrams to the best communication node divided by a difference between the latest receiving time and the earliest receiving time. For example, if the total number of the ICMP detection datagrams transmitted by the second transmission module 104 is N and each of the ICMP detection datagrams contains P bytes, the ICMP detection datagrams transmitted by the second transmission module 104 are N*P*8. The upstream bandwidth is equal to N*P*8 divided by the difference between the latest receiving time and the earliest receiving time.

The network device of the disclosure identifies a network server which returns the ICMP request datagram by increasing the second value of the TTL sequence of the ICMP request datagram. Therefore, the upstream bandwidth is measured, improving flow control and accuracy.

While various embodiments and methods of the present disclosure have been described, it should be understood that they have been presented by example only and not by limitation. Thus the breadth and scope of the present disclosure should not be limited by the above-described embodiments, but should be defined only in accordance with the following claims and their equivalents.

What is claimed is:

1. A network device for measuring upstream bandwidth of a communication network, the communication network comprising a server and a plurality of communication nodes configured between the network device and the server, the network device comprising a processor, a memory, and one or more programs, wherein the one or more programs are stored in the memory and operable to be executed by the processor, the programs comprising:

a first transmission module operable to transmit a sequence of Internet control message protocol (ICMP) request datagrams corresponding to a sequence of time to live (TTL) to the server via the communication nodes, wherein the sequence of the TTL is increased by degrees from a first value to a second value and when one of the ICMP request datagrams reaches one of the communication nodes, the TTL of the ICMP request datagram is decreased by 1, when one of the communication nodes receives an ICMP request datagram with TTL of 1, the communication node transmits an overtime datagram to the network device, wherein the ICMP request datagrams corresponding to the sequence of TTL are transmitted to the server at the same time that the communication node transmits the overtime datagram to the network device;

a determination module operable to determine whether one of the communication nodes transmits the overtime datagram to the network device to respond one of the ICMP request datagrams transmitted by the first transmission module, and designate the communication node that transmits the overtime datagram first as the best communication node;

a second transmission module operable to transmit a plurality of ICMP detection datagrams to the first responding node which is designed as the best communication node;

a receiving module operable to receive response datagrams corresponding to the plurality of ICMP detection datagrams from the best communication node and record receiving time of the response datagrams; and a calculation module operable to calculate an upstream bandwidth according to size of the plurality of ICMP detection datagrams and the recorded receiving time of the response datagrams corresponding to the plurality of ICMP detection datagrams;

wherein the first transmission module is further operable to increase the second value and transmit another sequence of ICMP request datagrams with another sequence of TTL from the first value to the increased second value when the network device does not receive the overtime datagram.

2. The network device as claimed in claim 1, wherein the communication network is an asymmetrical digital subscriber loop (ADSL) network.

3. The network device as claimed in claim 1, wherein the plurality of ICMP detection datagrams is transmitted to the best communication node at the same time.

4. The network device as claimed in claim 3, wherein the receiving time of the response datagrams corresponding to the plurality of ICMP detection datagrams to the best communication node comprises an earliest receiving time and a latest receiving time, wherein the earliest receiving time indicates the receiving time of the first received response datagram of the response datagrams, and the latest receiving time indicates the receiving time of the latest received response datagram of the response datagrams, wherein the upstream bandwidth is equal to a bit number of the plurality of ICMP detection datagrams to the best communication node divided by a difference between the latest receiving time and the earliest receiving time, and the upstream bandwidth is obtained without utilizing roundtrip time of the plurality of ICMP detection datagrams.

5. The network device as claimed in claim 3, wherein each ICMP detection datagram is of the same datagram size.

6. A method of measuring upstream bandwidth employed by a network device in a communication network comprising a server and a plurality of communication nodes configured between the network device and the server, the method comprising:

transmitting a sequence of Internet control message protocol (ICMP) request datagrams corresponding to a sequence of time to live (TTL) to the server via the communication nodes, wherein the sequence of the TTL is increased by degrees from a first value to a second value and when one of the ICMP request datagrams reaches one of the communication nodes, the TTL of the ICMP request datagram is decreased by 1, if one of the communication nodes receives an ICMP request datagram with TTL of 1, the communication node transmits an overtime datagram to the network device, wherein the ICMP request datagrams corresponding to the sequence of TTL are transmitted to the server at the same time that the communication node transmits the overtime datagram to the network device;

determining whether one of the communication nodes has transmitted the overtime datagram to the network device to respond one of the ICMP request datagrams transmitted by the first transmission module and designating the communication node that transmits the overtime datagram first as the best communication node;

increasing the second value and transmitting another sequence of ICMP request datagrams with another sequence of TTL from the first value to the increased second value when the network device does not receive the overtime datagram from the communication nodes;

transmitting a plurality of ICMP detection datagrams to the first responding node which is designed as the best communication node;

receiving response datagrams corresponding to the plurality of ICMP detection datagrams from the best communication node and recording receiving time of the response datagrams; and calculating the upstream bandwidth according to size of the plurality of ICMP detection datagrams and the recorded receiving time of the response datagrams corresponding to the plurality of ICMP detection datagrams.

7. The method as claimed in claim 6, wherein the communication network is an asymmetrical digital subscriber loop (ADSL) network.

8. The method as claimed in claim 6, wherein the plurality of ICMP detection datagrams is transmitted to the best communication node at the same time.

9. The method as claimed in claim 8, wherein the receiving time of the response datagrams corresponding to the plurality of ICMP detection datagrams to the best communication node comprises an earliest receiving time and a latest receiving time, wherein the earliest receiving time indicates the receiving time of the first received response datagram of the response datagrams, and the latest receiving time indicates the receiving time of the latest received response datagram of the response datagrams, wherein the upstream bandwidth is equal to a bit number of the plurality of ICMP detection datagrams to the best communication node divided by a difference between the latest receiving time and the earliest receiving time, and the upstream bandwidth is obtained without utilizing roundtrip time of the plurality of ICMP detection datagrams.

10. The method as claimed in claim 8, wherein each ICMP detection datagram is of the same datagram size.

* * * * *